Feb. 7, 1961 W. H. MARSH 2,970,441
HYDRAULIC POWER PLANT
Filed Oct. 4, 1955 4 Sheets-Sheet 1
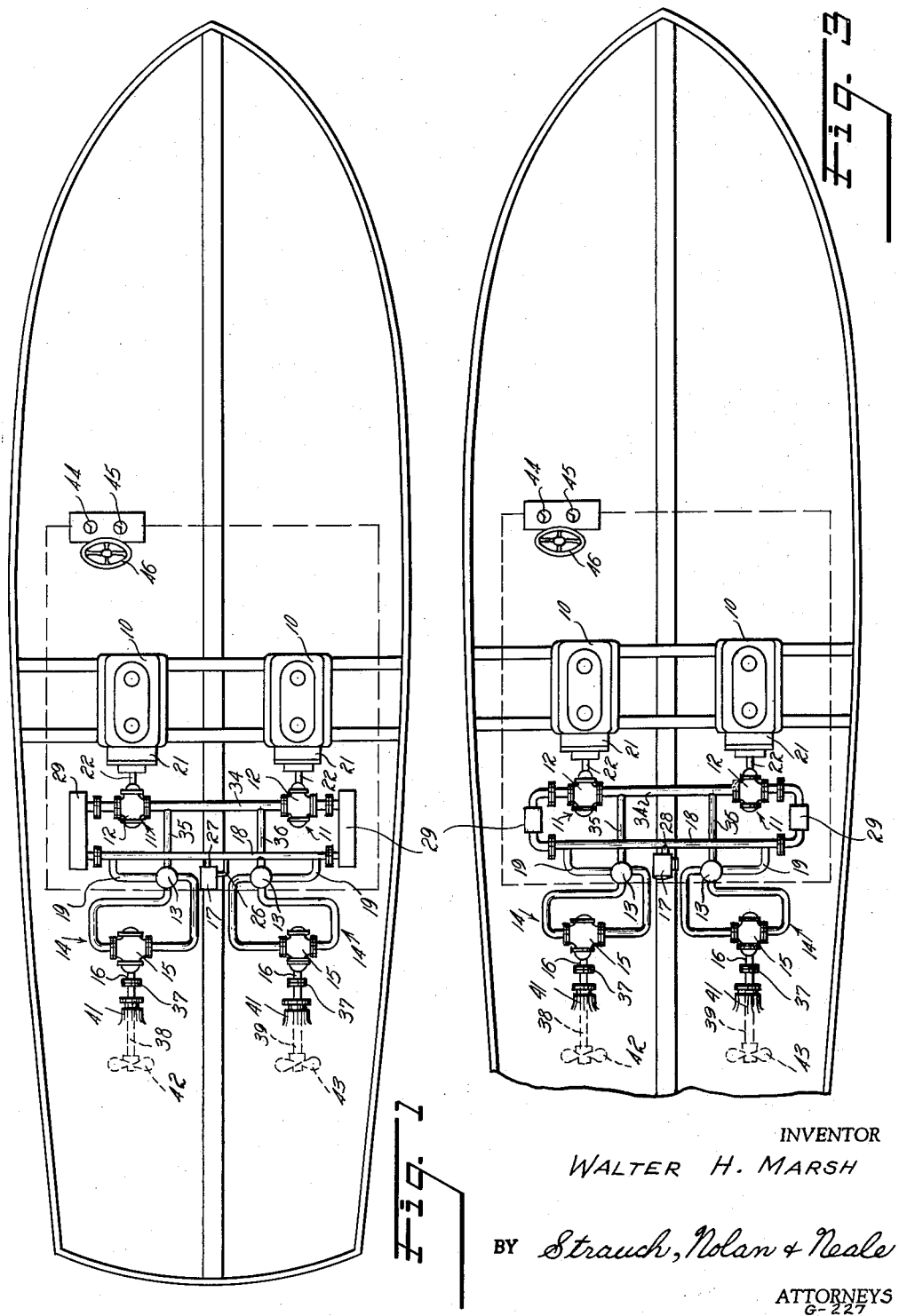
INVENTOR
WALTER H. MARSH
BY Strauch, Nolan & Neale
ATTORNEYS
G-227

Feb. 7, 1961
W. H. MARSH
2,970,441
HYDRAULIC POWER PLANT
Filed Oct. 4, 1955
4 Sheets-Sheet 2
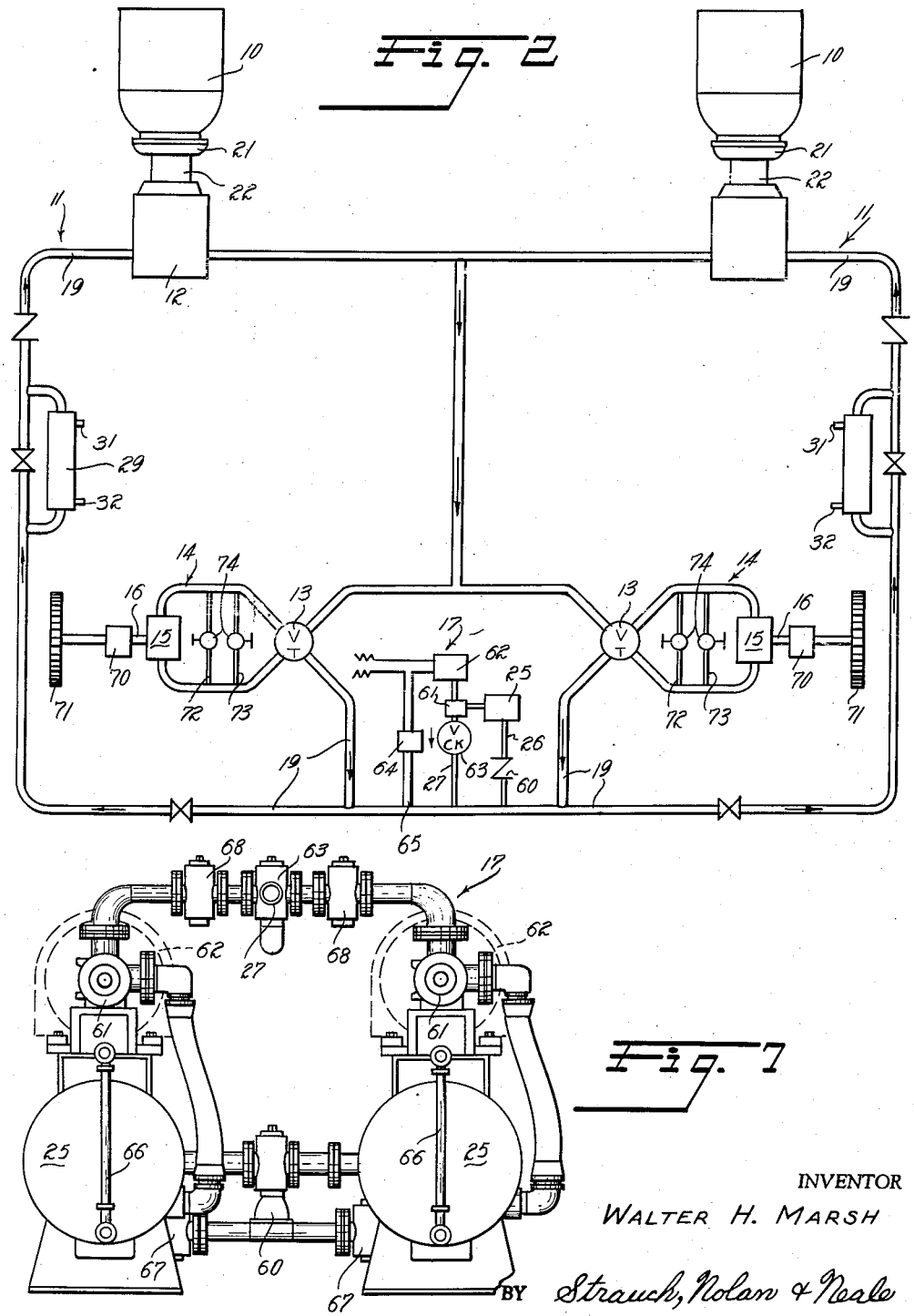
INVENTOR
WALTER H. MARSH
BY Strauch, Nolan & Neale
ATTORNEYS
G-227

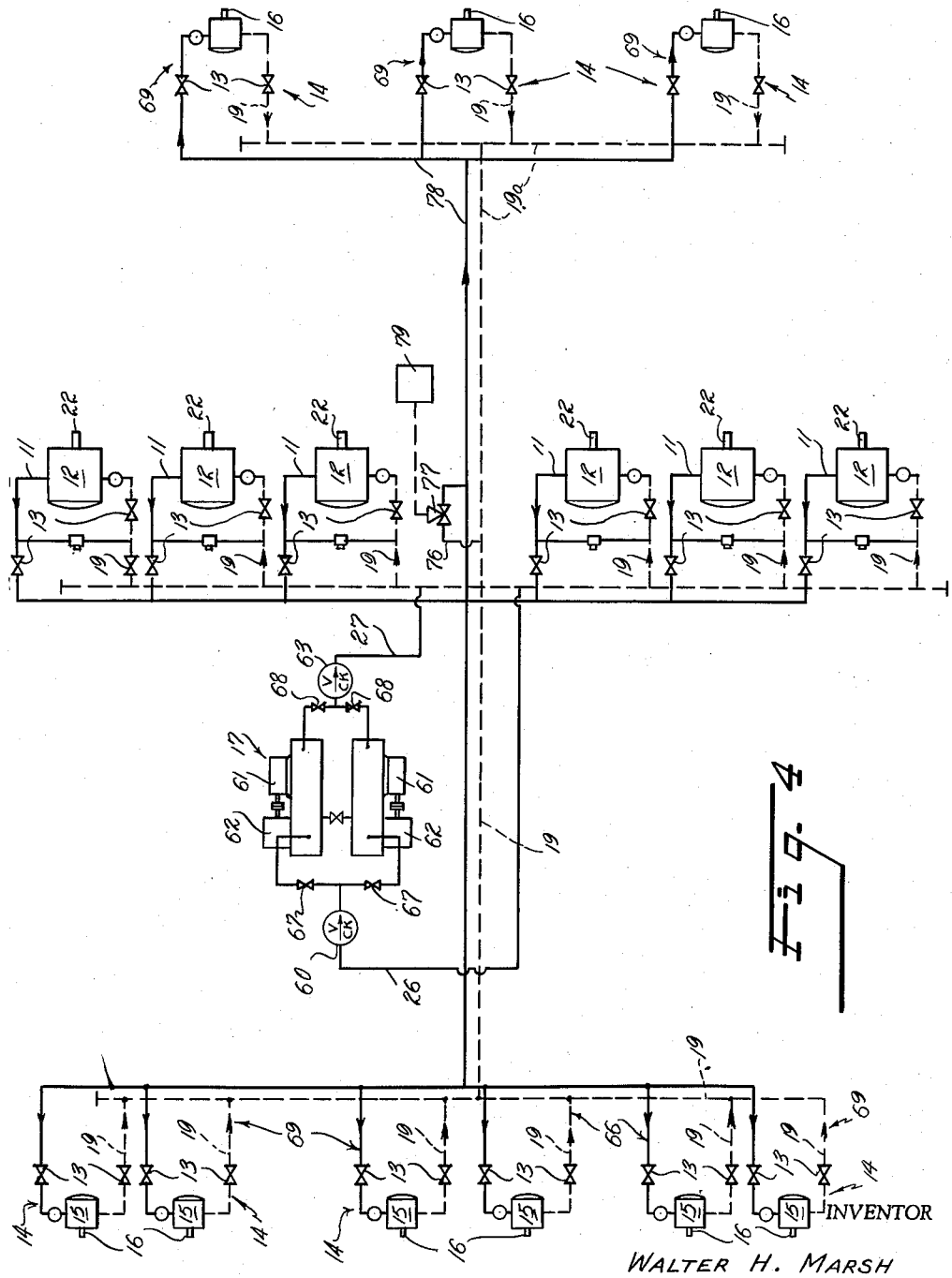

Feb. 7, 1961 W. H. MARSH 2,970,441
HYDRAULIC POWER PLANT
Filed Oct. 4, 1955 4 Sheets-Sheet 4

INVENTOR
WALTER H. MARSH

BY *Strauch, Nolan & Neale*

ATTORNEYS
G-227

United States Patent Office 2,970,441
Patented Feb. 7, 1961

2,970,441

HYDRAULIC POWER PLANT

Walter H. Marsh, Pittsburgh, Pa., assignor to Rockwell Manufacturing Company, Pittsburgh, Pa., a corporation of Pennsylvania Filed Oct. 4, 1955, Ser. No. 538,313

4 Claims. (Cl. 60—53)

The present invention relates to hydraulic power plants and more particularly to improved and simplified closed fluid circuit power plants adapted for use in propulsion of marine vessels, land vehicles and muti-station pumping systems.

Hydraulic power plants have heretofore been proposed of both the closed fluid circuit and open fluid circuit types. These prior hydraulic power plants have not, however, come into general usage particularly in the fields of marine vessels, land vehicles and multi-station pumping systems because of their inherent cavitation problems and the long time interval required to bring the motive fluid up to practical operating speeds in starting, reversal of fluid flow in braking and like operations.

It, accordingly, is a primary object of the present invention to provide a hydraulic power plant in which the motive fluid is brought to its idling flow rate in the basic pump circuit upon starting of the prime mover employed and maintained at least at its idling flow rate at the pump inlet at all times thereafter so as to render the hydraulic power plant ready to deliver driving power instantly upon demand.

A further important object of the present invention is to provide a closed fluid circuit type power plant with a pressurizing unit arranged to maintain a full supply of motive fluid at the inlet side of the prime mover driven fluid pump at all times after starting of the prime mover to eliminate the cavitation induced inefficiencies of the prior proposed hydraulic power plants.

Still another object of the present invention resides in the provision of a multi-drive hydraulic power plant having a common fluid return conduit between the multiple fluid motors and related multiple fluid pumps subject to the action of a single pressurizing unit arranged to maintain a full supply of motive fluid at the inlet sides of the several prime mover driven fluid pumps at all times after starting of the prime mover to eliminate the cavitation induced inefficiencies of the prior proposed hydraulic power plants.

Another object of the present invention is to provide a hydraulic power plant made up of several prime mover driven hydraulic pump and hydraulic motor sets having a common branched conduit leading from the several hydraulic pumps to respective hydraulic motor control valves, a common branched conduit leading from the several hydraulic motor control valves back to the several hydraulic pumps and respective hydraulic motor fluid circuits connecting the respective hydraulic motor control valves to a respective hydraulic motor to provide for individual control of each of the hydraulic motors whereby the steering, braking and primary direction of movement of marine and land vehicles may be readily effected by selective operation of the several hydraulic motors.

Still another object of the present invention resides in providing the respective hydraulic motor fluid circuits of the preceding objects with a pair of parallel by-pass conduits provided with oppositely acting one way pressure limit switches to by-pass fluid around the respective hydraulic motors in event there is an overload of predetermined value imposed on the motor.

Another object of the present invention is to provide a closed fluid circuit hydraulic power plant having a fluid supply circuit including a hydraulic pump and a fluid return circuit including a hydraulic motor with a by-pass conduit controlled by a pressure regulating valve set at the maximum operating pressure of the system so as to by-pass motive fluid from the supply circuit to the return circuit in event the operating pressures in the supply circuit exceeds the designated maximum operating pressure.

A further object of the present invention is to provide a closed fluid circuit hydraulic power plant having a fluid supply circuit leading from hydraulic pump means to hydraulic motor means and a fluid return circuit leading from the hydraulic motor means to the hydraulic pump means with a motive fluid cooler unit exposed to the cooling effect of circulated water.

Still other objects will become apparent as the following description is read in conjunction with the appended claims and accompanying drawings wherein:

Figure 1 is a diagrammatic illustration of one form of hydraulic power plant embodying the improvements of the present invention adapted for use in driving a marine vessel;

Figure 2 is a diagrammatic illustration of a further form of hydraulic power plant embodying the improvements of the present invention adapted for use in driving a land vehicle;

Figure 3 is a diagrammatic view similar to Figure 1 illustrating a modified form of pressurizing unit incorporated in the hydraulic power plant of Figure 1;

Figure 5:
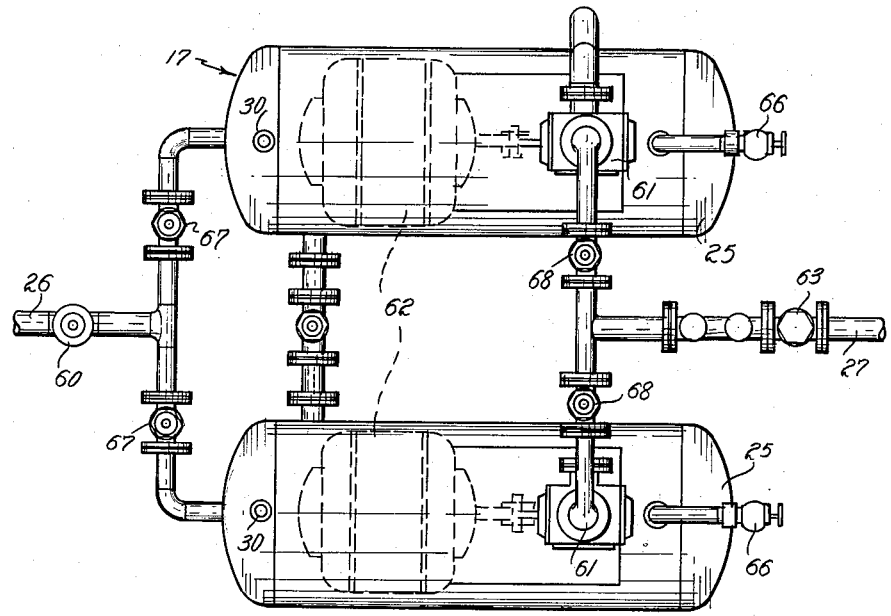
Figure 6:
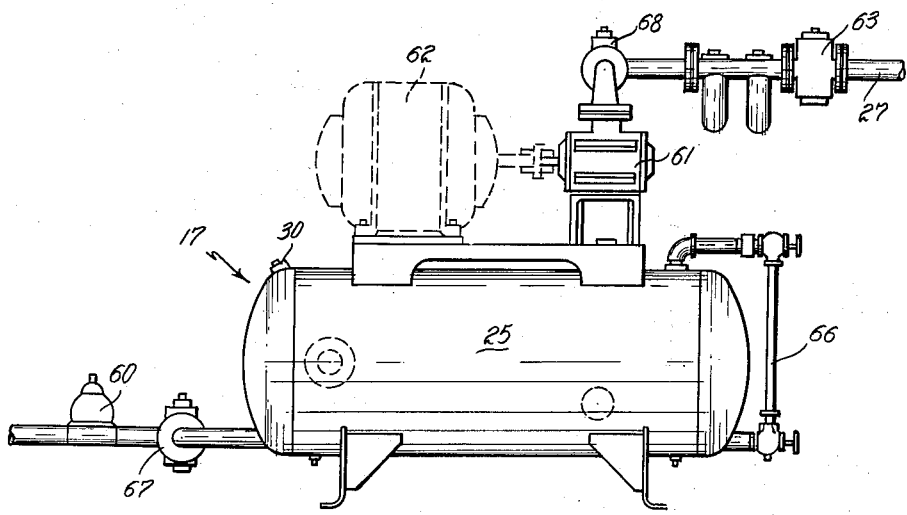

Figure 4 is a diagrammatic view of a still further form of hydraulic power plant embodying the improvements of the present invention in a multiple pumping station system illustrating the ease with which additional prime mover and pump circuits and motor circuits may be provided through use of the improvements of the present invention; and Figures 5, 6 and 7 are respectively top plan, side elevational and end elevational views of a pressurizing unit suitable for use in any of the illustrated power plants of Figures 1, 2 and 4 but particularly designed for the multiple circuit power plant of Figure 4.

With continued reference to the drawings wherein like reference numerals are employed throughout to indicate the same parts, hydraulic power plants according to the present invention are made up of one or more sets of prime movers 10, hydraulic pump circuits 11 including any suitable prime mover driven hydraulic pump 12 and a control valve 13, hydraulic motor circuits 14 including at least a hydraulic motor 15 having a power take-off shaft 16, and a pressurizing unit 17 of any suitable structure connected into the common branch 18 of a low pressure motive fluid return circuit 19 of the hydraulic pump circuit 11 as more fully hereinafter pointed out. Insofar as the present invention is concerned the prime movers 10 may take any desired form but preferably take the form of diesel engines suitably connected through gear boxes 21 to hydraulic pump shafts 22. Hydraulic pumps 12 may also take any desired form but that found most suitable is a rotary type pump of the type illustrated in United States Letters Patent 2,632,400 issued March 24, 1953 to the assignee of this application on an application of the instant applicant. As will be clear from a consideration of this prior patent the rotary hydraulic unit shown and described therein is equally useful as a hydraulic motor. It is contemplated that the hydraulic motors 15 of this invention shall also be of the rotary type shown in this prior patent although it is to be understood that any other suitable type of hydraulic motor may be used.

The control valves 13 of the present invention may be either of the multi-port type schematically illustrated in Figures 1, 2 and 3 or a series of individual valves as illustrated in Figure 4. If the individual valves of Figure 4 are used they must be adapted in any well known and conventional manner (not shown) for group operation to effect the desired throttling and directional fluid of the motive flow to be presently pointed out.

Pressurizing unit 17 may take the form of a make-up tank 25 (Figure 2) or a plurality of such tanks (Figure 7) connected to the common branch 18 of motive fluid return circuit 19 at spaced points through respective inlet and outlet pipe connections 26 and 27 (Figures 1, 2 and 4 through 7) and vented to the atmosphere as at 30 (Figures 5 and 6). Alternatively the pressurizing unit 17 may be in the form of a simple accumulator such as the dome shaped unit illustrated in Figure 3 connected to the common branch 18 of the motive fluid return circuit through pipe connection 28 and having a gas under pressure therein to maintain a predetermined pressure in the working circuit. In either case, the amount of fluid contained in the pressurizing unit need only be a small percentage, for example, not more than 30%, of the amount required to completely fill the working circuit rather than the much greater amount customarily specified in hydraulic power plants not utilizing the improvements of the present invention.

In the make-up tank type of pressurizer, the inlet connections 26 are provided with pressure limit one way valves 60 adapted to pass fluid from branch line 19 to tank 25 when the system pressure exceeds the predesigned maximum pressure, for example 1500 lbs., and a charge pump 61 preferably driven by a separately controlled electric motor 62 energized from the battery starter circuit conventionally employed with diesel engines of the type here contemplated. Pump 61 is adapted to pump hydraulic fluid from tank 25 into branch conduit 19 whenever the inlet flow to pumps 12 is deficient in volume as indicated by a drop in line pressure below the normal idle operating pressure. To accomplish this, outlet connection 27 is provided with one way valve 63 adapted to pass fluid from make up tank 25 to branch line 19 when pump 61 and motor 62 are operating. Starting and stopping of pump 61 and motor 62 is effected through any suitable automatic controller, such as a pressure responsive switch 64 interposed in the electrical leads to motor 62 and connected to branch 18 through pipe connection 65 to be responsive to a drop in line pressure in branch 18 below normal operating pressure.

In the dual tank unit of Figures 5, 6 and 7 each of the tanks 25 is provided with a sight gage 66 and respective manually controlled inlet and outlet valves 67 and 68 permitting selective use of both tanks or either of the tanks depending upon the number of pumping stations 69 (Figure 4) that may be operating.

Preferably the motive fluid return circuits 19 at a point between the common branch 18 and the respective hydraulic pump inlets are provided with cooler units 29 (Figures 1, 2 and 3) of the water cooled type for keeping the temperature of the motive fluid below a predetermined maximum temperature. In marine usage, such as illustrated in Figures 1 and 3, these cooling units may be suitably located to be exposed to circulation therearound of the sea water through which the vessel is travelling. In the case of power plants employed in land vehicles or stationary land installations, the cooling units preferably take the form of a suitable water jacket having respective water inlet and outlet connections 31 and 32 leading in conventional manner to a suitable radiator structure (not shown).

Referring specifically to the marine vessel embodiments of Figures 1 and 3, a typical power plant that has proven successful in use is made up of a pair of engines 10 arranged in lateral spaced, side-by-side relation on opposite sides of the keel of the boat and connected through suitable gear boxes 21 to respective hydraulic pumps 12 of the type disclosed in Letters Patent 2,632,400. The outlets of the pumps 12 are interconnected through a common supply conduit 34 and respective branch conduits 35 and 36 to the inlet connections of respective multi-port control valves 13. Each of these control valves has a motive fluid return connection 19 leading to the common fluid return branch 18 the opposite ends of which lead to the motive fluid inlets of respective cooling units 29. The outlets of these cooling units are in turn connected by conduits forming a continuation of the motive fluid return circuits 19 to the respective inlet connections of hydraulic pumps 12 to complete the respective motive fluid pump circuits 11.

Valves 13 are each provided with two additional connections respectively connected to the opposite ends of the respective hydraulic motor circuits 14. Each of the hydraulic motor shafts 16 are coupled at 37 to respective propeller shafts 38 and 39 extending through conventional packing glands 41 into the sea water. The free ends of each of the propeller shafts are equipped in conventional manner with screw or other suitable propellers 42 and 43.

The respective valves 13 are adapted for individual remote control through any suitable control means having control regulators 44 and 45 located adjacent the steering control wheel 46. As a result of this remote control system, the valves 13 can be individually actuated by the helmsman to selectively control the discharge of the motive fluid from the respective supply circuits to control the direction of movement and braking of the vessel to best maneuver the vessel in the desired manner. The helmsman may also, through suitable engine throttle controls (not shown) forming no part of the present invention, control the speed of the engines to vary the rate of flow of the motive fluid through the pump circuits 11 and thus control the speed of the vessel in its forward, backward or turning movement.

Assuming for the moment that control valves 13 are set in their normal non-driving positions (Figures 1 and 3), that engines 10 are operating at idling speed, that the fluid working circuits 11 and 14 are filled with motive fluid (preferably a suitable liquid oil) and that the pressurizing unit 17 has its required complement of make up motive fluid therein, motive fluid will be permitted to circulate in the pump circuits 11 through suitable valve passages adapted to directly connect each of the valve inlet conduits 35 to its respective return conduit 19. In this position of valves 13, the opposite ends of the motor circuits 14 are preferably blocked off leaving the motor circuits filled but inactive.

Upon moving valves 13 to their respective first drive positions, motive fluid will pass from pumps 12 through the respective valve inlet conduits 35 into the motor circuit connections opposite return conduits 19, then pass through the motor circuits driving the hydraulic motors 15 and attached propellers 42 and 43 in a direction to effect forward movement of the vessel and be discharged from the motor circuit connections opposite valve inlet conduits 35 into return conduits 19 and be returned to the inlet connections of pump 12. Upon acceleration of engines 10 equally or unequally the speed of the respecttive hydraulic motors will increase equally propelling the vessel forward at correspondingly accelerating speed on a course determined solely by rudder heading since the motive fluid leaves the pumps through a common circuit branch. If the helmsman wishes a rapid change of heading of the vessel, say to the left, he will set the rudder and decelerate the left hydraulic motor by throttling the motor fluid through valve 13 or, in emergencies, merely reverse the motive fluid flow through the lefthand motor circuit 14. The result in either case will be to permit the right hand hydraulic power plant to overrun the dragging left hand hydraulic power plant causing the vessel to turn around the left hand propeller which acts in essence like a forwardly or rearwardly sliding fulcrum depending upon whether the deceleration of the engine or reversal of motor fluid has been effected. The same maneuvering of the vessel to the right is accomplished by opposite operation of the power plants.

In event it is desired to brake the forward movement of the vessel on a straight course, both control valves 13 will be thrown to their full reversed flow position in which event the propellers will be driven at equal speeds in reverse. If braking accompanied by a change in bearing of the vessel is required this is readily accomplished by moving one of the valves 13 to a throttled reverse position.

By operating both power plants but in opposite directions, the vessel can be effectively held against forward or reverse movement and merely turned either clockwise or counterclockwise as desired. Since the hydraulic circuit is always maintained under pressure to assume an adequate incoming flow of fluid to the pumps 12, quick response in acceleration and change in direction of drive of the hydraulic motors 15 is assured and cavitation effects and leakage of compressible air into the closed hydraulic circuit is avoided. As a consequence, the efficiency and effective trouble free life of the power plants are both increased markedly by this invention.

Referring now to Figure 2, the hydraulic motor power take-off shafts are connected through multi-speed gear transmissions indicated diagrammatically by numeral 70 to a drive wheel 71 illustrated as a sprocket wheel of the type used on track laying vehicles. The motor circuits 14 here illustrated are further each provided with a pair of parallel by-pass conduits 72 and 73 respectively adapted through suitably arranged one way valves 74 to by-pass motive fluid from which ever motor circuit branch is being used as the supply branch to the return branch should an overload be encountered by the respective drive wheels 71. The one way valves 74 are pressure limit valves and are set at the value of the maximum pressure, say 1500 lbs., under which the system is designed to operate. Since maneuvering of track laying vehicles of the type heretofore mentioned is customarily accomplished by selectively speeding up, retarding and reversing the direction of movement of the desired tracks, it will be appreciated that the present hydraulic power plants with their increased efficiency and quicker response are very admirably suited for powering such land vehicles.

Referring to Figure 4, the power plants of this invention are shown in the form of a multiple number of engines 10 and hydraulic pumps 12 interconnected to supply power for widely scattered pumping stations 69 as often used at oil refineries. This view illustrates the versatility of the power plants made possible through use of pressurizing units on the pump intake lines which permit use of long fluid lines from an engine house housing several of the prime mover and pump units to pumping locations requiring installation of only a small hydraulic motor 15 with its associated remote controlled valving. In this system 8 inch supply and return lines are employed except for lines 78 and 19a which are 6 inch lines. As a consequence, it is desirable to provide a by-pass circuit 76 between lines 78 and 19a having a maximum pressure regulator valve 77 therein for by-passing fluid from the main supply line 78 to the main return line 19a should the maximum supply pressure for the 6 inch be exceeded by reason of the greater demands made on the power plants to supply the full speed required of the 8 inch lines. A temperature controller 79 is also connected into regulator valve 77 to take care of over temperature conditions that may prevail in the 6 inch lines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hydraulic power plant having at least two prime movers; unidirectional hydraulic pump means individual to each of said prime movers drivingly connected to its respective prime mover and having respective fluid inlet and outlet connections; at least two hydraulic motor means each having a pair of fluid connections and a power takeoff shaft; fluid supply conduit means including a high pressure manifold having branches equal in number to the number of said hydraulic pump means each branch being connected to the respective outlet connections of said hydraulic pump means and also including a low pressure manifold having branches equal in number to the number of said hydraulic motor means; a respective throttling and reversing valve means individual to each hydraulic motor means and each having an inlet connection connected to said high pressure manifold, supply connections connected to a respective hydraulic motor means and outlet connections connected to said low pressure manifold; fluid return conduit means including low pressure manifold branch connections equal in number to the number of said hydraulic pump means connected to the inlet connections of said hydraulic pump means and a connection connected to said low pressure manifold to complete respective intercommunicating closed fluid circuits for transmitting fluid from the outlet connections of said hydraulic pump means to said hydraulic motor means through said respective valve means and returning fluid from said hydraulic motor means to said hydraulic pump means through said respective valve means and said fluid return conduit means; and pressurizing means comprising a single outlet connection directly connected to said fluid return conduit means, a closed fluid filled tank having a check valve controlled conduit connected to said fluid return conduit means to permit fluid flow to said tank upon an increase of the fluid pressure in said fliud return conduit means and a charge pump and a check valve in said single outlet connection effective to supply fluid to said fluid return conduit means and pressure responsive power means for selectively driving said charge pump to supply fluid to said fluid return conduit means upon a decrease of the fluid pressure in said fluid return conduit means whereby pressurized fluid may be supp'ied to the respective fluid inlets of said hydraulic pump means to maintain a full supply of fluid to said hydraulic pump means and thereby eliminate cavitation induced inefficiencies in the power plant.

2. A hydraulic power plant according to claim 1 wherein said power means comprises an electric motor and a minimum pressure responsive switch connected to said fluid return conduit means to alternately start and stop said electric motor as the fluid pressure in said fluid return conduit means drops below and reaches the pressure of the predetermined incoming supply.

3. In a closed circuit hydraulic power plant having a plurality of sets of prime mover driven hydraulic pumps, respective hydraulic motors and valve controlled supply and return conduit means having a common supply branch and individual throttling and reversing control valves for each hydraulic motor directly connected to said common supply branch and its respective hydraulic motor to supply hydraulic motive fluid from said plurality of pumps to said hydraulic motors and return said hydraulic motive fluid to said plurality of prime mover driven hydraulic pumps for re-use; a common return conduit section connecting said individual valves to said plurality of prime mover driven hydraulic pumps; and pressurizing means connected to said common conduit section for maintaining a full supply of fluid to said prime mover driven hydraulic pumps and the pressure of said supply of fluid at a predetermined value, said pressurizing means comprising a make up tank vented to the atmosphere and containing a fractional quantity of hydraulic fluid compared to the quantity in the working circuit, a one way pressure limit valve controlled conduit directly connecting said make up tank to said common return conduit section to bleed hydraulic fluid back into said make up tank when the pressure of the fluid in the working circuit exceeds its maximum operating limit, a charge pump connected to said tank for pumping hydraulic fluid from said tank, a one way valve controlled conduit connecting the outlet of said charge pump to said common return conduit section to replace hydraulic fluid lost or bled from said working circuit as required and means responsive to a drop in pressure in said common return conduit section below a predetermined minimum for starting and stopping said charge pump.

4. In a closed circuit hydraulic power plant having a plurality of sets of prime mover driven hydraulic pumps, respective hydraulic motors and valve controlled supply and return conduit means having a common supply branch and individual throttling and reversing control valves for each hydraulic motor directly connected to said common supply branch and its respective hydraulic motor to supply hydraulic motive fluid from said plurality of pumps to said hydraulic motors and return said hydraulic motive fluid to said plurality of prime mover driven hydraulic pumps for re-use, a common return conduit section connecting said individual valves to said plurality of prime mover driven hydraulic pumps; and pressurizing means connected to said common conduit section for maintaining a full supply of fluid to said prime mover driven hydraulic pumps and the pressure of said supply of fluid at a predetermined value, said pressurizing means comprising a pair of make up tanks each vented to the atmosphere and containing a fractional quantity of hydraulic fluid compared to the quantity in the working circuit, a one way pressure limit valve controlled inlet conduit having two branches at one end for directly connecting said tanks to said common return conduit section to bleed hydraulic fluid back into said tanks when the pressure of the fluid in the working circuit exceeds its maximum operating limit, a charge pump mounted on each of said tanks for pumping hydraulic fluid from its respective tank, a one way valve controlled supply conduit having two branches at one end for connecting the outlets of said charge pumps to said common return conduit section to replace hydraulic fluid lost or bled from said working circuit as required, manual control valves in each of the branches of said inlet conduit and each of the branches of said supply conduit adapted for selective operation to operatively connect both or a selected one of said tanks to said common return conduit section and means responsive to pressure conditions in said common return conduit section for starting and stopping said charge pump.

References Cited in the file of this patent
UNITED STATES PATENTS

| | | |
|---|---|---|
| 958,212 | Baab | May 17, 1910 |
| 1,179,736 | Manly | Apr. 18, 1916 |
| 1,563,337 | Caputo | Dec. 1, 1925 |
| 1,616,841 | Beebe | Feb. 8, 1927 |
| 2,239,481 | Christensen | Apr. 22, 1941 |
| 2,431,719 | Wilkin | Dec. 2, 1947 |
| 2,465,485 | Robinson | Mar. 29, 1949 |
| 2,572,748 | Noll et al. | Oct. 23, 1951 |
| 2,621,479 | Wright | Dec. 16, 1952 |
| 2,655,785 | Vlachos et al. | Oct. 20, 1953 |
| 2,711,077 | Adams | June 21, 1955 |

FOREIGN PATENTS

| | | |
|---|---|---|
| 286,965 | France | Mar. 18, 1899 |